United States Patent
Tu et al.

(10) Patent No.: US 11,698,005 B2
(45) Date of Patent: Jul. 11, 2023

(54) FLOW DIVERTER FOR MID-TURBINE FRAME COOLING AIR DELIVERY

(71) Applicant: Raytheon Technologies Corporation, Farmington, CT (US)

(72) Inventors: John S. Tu, Agawam, MA (US); Robert Newman, South Glastonbury, CT (US); Paul K. Sanchez, Wellington, FL (US); Jeffrey J. Lienau, Wethersfield, CT (US); John T. Ols, Northborough, MA (US); Prabaharan Manoharan, Tamil Nadu (IN); Venu Sambarapu, Andhra Pradesh (IN); Rajendra Prasad Uppara Allabanda, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 15 days.

(21) Appl. No.: 17/155,707

(22) Filed: Jan. 22, 2021

(65) Prior Publication Data

US 2021/0246832 A1  Aug. 12, 2021

(30) Foreign Application Priority Data

Feb. 7, 2020 (IN) .............................. 202011005508

(51) Int. Cl.
*F01D 25/14* (2006.01)
*F02C 7/18* (2006.01)
(Continued)

(52) U.S. Cl.
CPC .............. *F01D 25/14* (2013.01); *F01D 9/06* (2013.01); *F02C 7/18* (2013.01); *F02C 9/18* (2013.01);
(Continued)

(58) Field of Classification Search
CPC .................................. F01D 25/14; F01D 9/06
See application file for complete search history.

(56) References Cited

U.S. PATENT DOCUMENTS 7,108,479 B2 * 9/2006 Beverley .................. F01D 9/06
415/115
8,100,633 B2 1/2012 Propheter-Hinckley et al.
(Continued)

FOREIGN PATENT DOCUMENTS

EP 1489265 A2 12/2004
EP 3392458 A1 10/2018
(Continued)

OTHER PUBLICATIONS

European Search Report for European Application No. 21155059.5, dated Jun. 11, 2021, 9 pages.

*Primary Examiner* — Courtney D Heinle
*Assistant Examiner* — John S Hunter, Jr.
(74) *Attorney, Agent, or Firm* — Cantor Colburn LLP

(57) ABSTRACT

Flow diverters for installation in mid-turbine frame systems at a conduit outlet of gas turbine engines are described. The flow diverters include a diverter body having a connector portion defining a diverter inlet, a diverter extension at least partially defining a diverter outlet, and a curved portion arranged between the connector portion and the diverter extension, the curved portion configured to change a direction of flow from a first direction to a second direction that is about 90° from the first direction as the flow passes from the diverter inlet to the diverter outlet.

17 Claims, 8 Drawing Sheets

(51) Int. Cl.
*F02C 9/18* (2006.01)
*F01D 9/06* (2006.01)

(52) U.S. Cl.
CPC .... *F05D 2220/32* (2013.01); *F05D 2240/126* (2013.01); *F05D 2240/81* (2013.01); *F05D 2260/232* (2013.01); *F05D 2260/37* (2013.01)

(56) References Cited

U.S. PATENT DOCUMENTS

| | | | |
|---|---|---|---|
| 8,152,445 B2* | 4/2012 | Guemmer | F01D 9/04 415/58.7 |
| 9,803,501 B2 | 10/2017 | Wang | |
| 9,920,643 B2 | 3/2018 | Manzoori et al. | |
| 9,988,943 B2 | 6/2018 | Chasse, Jr. et al. | |
| 10,087,782 B2 | 10/2018 | Wang et al. | |
| 10,422,237 B2* | 9/2019 | McDavid | F01D 25/14 |
| 2010/0303610 A1 | 12/2010 | Wang et al. | |
| 2013/0283814 A1 | 10/2013 | Johns et al. | |
| 2018/0291754 A1 | 10/2018 | McDavid | |

FOREIGN PATENT DOCUMENTS

| | | | |
|---|---|---|---|
| EP | 3527783 A1 | 8/2019 | |
| WO | 9211444 A1 | 7/1992 | |

* cited by examiner

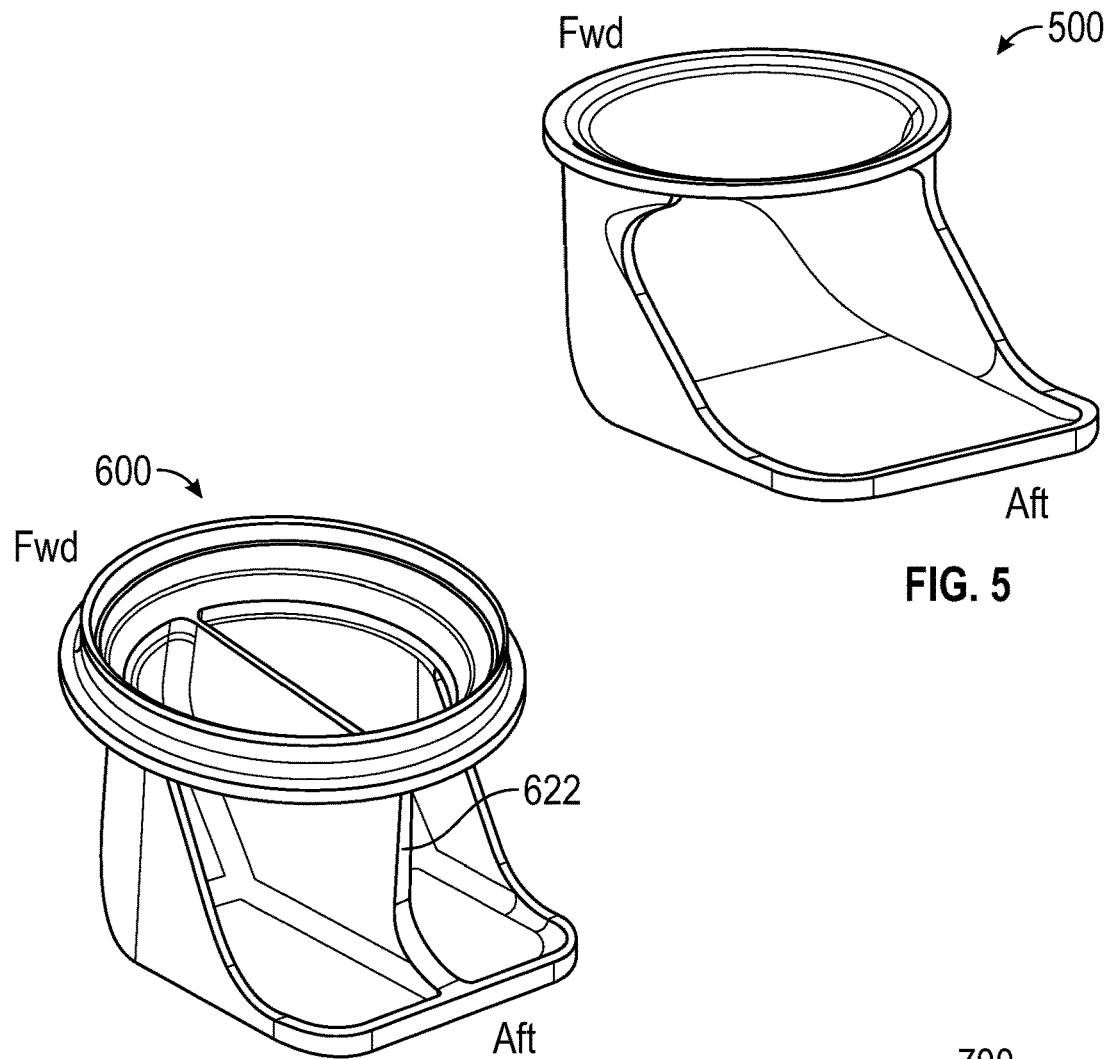
FIG. 5
FIG. 6
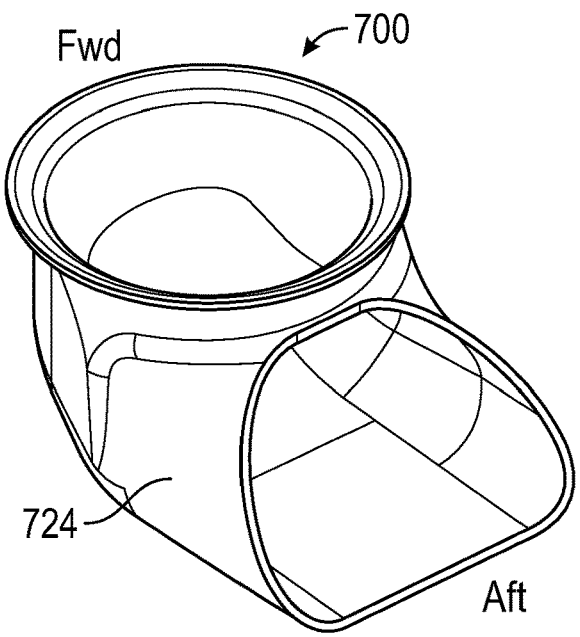
FIG. 7

FLOW DIVERTER FOR MID-TURBINE FRAME COOLING AIR DELIVERY

CROSS REFERENCE TO RELATED APPLICATIONS

This application claims the benefit of Indian Provisional Application No. 202011005508, filed Feb. 7, 2020, the disclosure which is incorporated herein by reference in its entirety.

BACKGROUND

The subject matter disclosed herein generally relates to gas turbine engines and, more particularly, to flow diverters for mid-turbine frame cooling air delivery for use in gas turbine engines.

Gas turbine engines include various sections that are subject to high temperatures, and ensuring cooling thereof is a goal of gas turbine engine systems. One such location requiring cooling is a mid-turbine frame system, located between a high-pressure turbine and the low-pressure turbine. The mid-turbine frame system may include a number of vanes extending between inner and outer diameter platforms. The platforms may require cooling.

For example, it is known to radially impinge cooling air against the outer platforms of a mid-turbine frame system to cool the platforms. The impinging air may be directed from a relatively cool air source, through a conduit, and through one or more apertures radially exterior to the platforms. A problem associated with impinging cooling air against the outer platform is that impingement cooling creates discrete cooling zones around the circumference of the outer platform. As a result, the outer platform will be non-uniformly cooled around its circumference. Such non-uniform cooling may cause the outer platform to be susceptible to thermal distortion. Therefore, there is a need for a stator fairing assembly with an internal structure that promotes uniform cooling within the assembly.

SUMMARY

According to some embodiments, gas turbine engines are provided. The gas turbine engines include a high pressure turbine system, a low pressure turbine system, a mid-turbine frame system arranged axially between the high pressure turbine system and the low pressure turbine system along an engine axis, a cooling air conduit fluidly connected to the mid-turbine frame system, the cooling air conduit configured to supply a cooling air to the mid-turbine frame system through a conduit outlet, and a flow diverter installed at the conduit outlet, the flow diverter having a diverter body. The diverter body includes a connector portion defining a diverter inlet, a diverter extension at least partially defining a diverter outlet, and a curved portion arranged between the connector portion and the diverter extension, the curved portion configured to change a direction of flow that is substantially radial relative to the engine axis to substantially axial relative to the engine axis as the flow passes from the diverter inlet to the diverter outlet, wherein the flow diverter is installed within the conduit outlet such the air passing through the flow diverter is directed aftward toward the low pressure turbine system.

In addition to one or more of the features described above, or as an alternative, further embodiments of the gas turbine engines may include that the flow diverter includes at least one diversion slot arranged to allow a portion of the flow through the flow diverter to flow in a non-aftward direction.

In addition to one or more of the features described above, or as an alternative, further embodiments of the gas turbine engines may include that the non-aftward direction portion of the flow is between about 0% and about 50% of the total flow through the flow diverter.

In addition to one or more of the features described above, or as an alternative, further embodiments of the gas turbine engines may include that the connector portion is configured to enable connection between the flow diverter the conduit outlet.

In addition to one or more of the features described above, or as an alternative, further embodiments of the gas turbine engines may include that the connector portion connects to the conduit outlet by one of press-fit, snap-fit, or interference-fit.

In addition to one or more of the features described above, or as an alternative, further embodiments of the gas turbine engines may include that the connector portion connects to the conduit outlet by one of welding, bonding, or one or more fasteners.

In addition to one or more of the features described above, or as an alternative, further embodiments of the gas turbine engines may include that the mid-turbine frame system comprises a frame, wherein the flow diverter is attached to the frame.

In addition to one or more of the features described above, or as an alternative, further embodiments of the gas turbine engines may include that the attachment of the flow diverter to the frame comprises one of fasteners, welding, and bonding.

In addition to one or more of the features described above, or as an alternative, further embodiments of the gas turbine engines may include that the mid-turbine frame system comprises a plurality of additional cooling air conduits and respective conduit outlets. The gas turbine engine further includes a plurality of additional flow diverters, wherein each conduit outlet has a respective flow diverter installed thereto.

In addition to one or more of the features described above, or as an alternative, further embodiments of the gas turbine engines may include that the flow diverter includes a separation rib configured to separate a flow that flows through the flow diverter, wherein the separation rib extends between the diverter inlet and the diverter outlet.

In addition to one or more of the features described above, or as an alternative, further embodiments of the gas turbine engines may include that the flow diverter includes a funnel structure that defines the diverter outlet.

In addition to one or more of the features described above, or as an alternative, further embodiments of the gas turbine engines may include that the connector portion has a radius from a center point, and the diverter extension has a total length from the center point that is greater than the radius.

In addition to one or more of the features described above, or as an alternative, further embodiments of the gas turbine engines may include that a difference between the total length and the radius is defined as an extension length, wherein the extension length is between about 0% and about 500% the length of the radius.

In addition to one or more of the features described above, or as an alternative, further embodiments of the gas turbine engines may include that the mid-turbine frame system comprises a vane platform, wherein the diverter extension is separated from the vane platform by a separation gap.

According to some embodiments, flow diverters for installation in mid-turbine frame systems at a conduit outlet of gas turbine engines are provided. The flow diverters include a diverter body having a connector portion defining a diverter inlet, a diverter extension at least partially defining a diverter outlet, and a curved portion arranged between the connector portion and the diverter extension, the curved portion configured to change a direction of flow from a first direction to a second direction that is about 90° from the first direction as the flow passes from the diverter inlet to the diverter outlet.

In addition to one or more of the features described above, or as an alternative, further embodiments of the flow diverters may include at least one diversion slot arranged to allow a portion of the flow through the flow diverter to flow in a direction different from the second direction, wherein the non-second direction portion of the flow is between about 0% and about 50% of the total flow through the flow diverter.

In addition to one or more of the features described above, or as an alternative, further embodiments of the flow diverters may include that the connector portion is configured to enable connection between the flow diverter the conduit outlet by one of press-fit, snap-fit, or interference-fit, welding, bonding, or one or more fasteners.

In addition to one or more of the features described above, or as an alternative, further embodiments of the flow diverters may include that the flow diverter includes a separation rib configured to separate a flow that flows through the flow diverter, wherein the separation rib extends between the diverter inlet and the diverter outlet.

In addition to one or more of the features described above, or as an alternative, further embodiments of the flow diverters may include that the flow diverter includes a funnel structure that defines the diverter outlet.

In addition to one or more of the features described above, or as an alternative, further embodiments of the flow diverters may include that the connector portion has a radius from a center point, and the diverter extension has a total length from the center point that is greater than the radius, wherein a difference between the total length and the radius is defined as an extension length, wherein the extension length is between about 0% and about 500% the length of the radius.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 5 is a schematic illustration of a flow diverter in accordance with an embodiment of the present disclosure;

FIG. 6 is a schematic illustration of a flow diverter in accordance with an embodiment of the present disclosure;

FIG. 7 is a schematic illustration of a flow diverter in accordance with an embodiment of the present disclosure;

DETAILED DESCRIPTION

Figure 1:
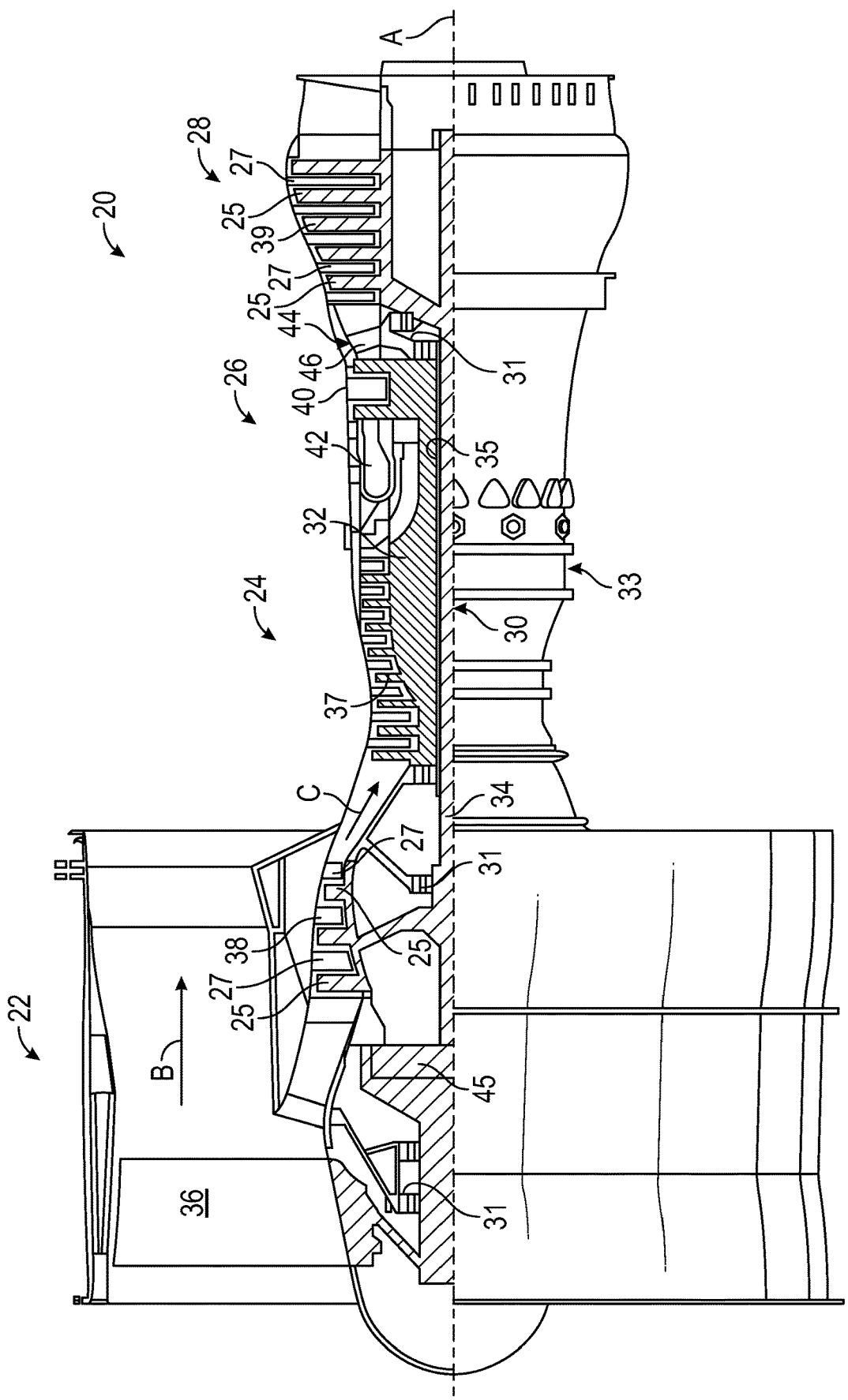
FIG. 1 is a schematic cross-sectional illustration of a gas turbine engine architecture that may employ various embodiments disclosed herein.

FIG. 1 schematically illustrates a gas turbine engine 20. The exemplary gas turbine engine 20 is a two-spool turbofan engine that generally incorporates a fan section 22, a compressor section 24, a combustor section 26, and a turbine section 28. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines.

The gas turbine engine 20 generally includes a low-speed spool 30 and a high-speed spool 32 mounted for rotation about an engine centerline longitudinal axis A. The low-speed spool 30 and the high-speed spool 32 may be mounted relative to an engine static structure 33 via several bearing systems 31. It should be understood that other bearing systems 31 may alternatively or additionally be provided.

The low-speed spool 30 generally includes an inner shaft 34 that interconnects a fan 36, a low-pressure compressor 38 and a low-pressure turbine 39. The inner shaft 34 can be connected to the fan 36 through a geared architecture 45 to drive the fan 36 at a lower speed than the low-speed spool 30. The high-speed spool 32 includes an outer shaft 35 that interconnects a high-pressure compressor 37 and a high-pressure turbine 40. In this embodiment, the inner shaft 34 and the outer shaft 35 are supported at various axial locations by bearing systems 31 positioned within the engine static structure 33.

A combustor 42 is arranged between the high-pressure compressor 37 and the high-pressure turbine 40. A mid-turbine frame 44 may be arranged generally between the high-pressure turbine 40 and the low-pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low-pressure compressor 38 and the high-pressure compressor 37, is mixed with fuel and burned in the combustor 42, and is then expanded over the high-pressure turbine 40 and the low-pressure turbine 39. The high-pressure turbine 40 and the low-pressure turbine 39 rotationally drive the respective high-speed spool 32 and the low-speed spool 30 in response to the expansion.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies add or extract energy from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Although a specific architecture for a gas turbine engine is depicted in the disclosed non-limiting example embodiment, it should be understood that the concepts described herein are not limited to use with the shown and described configuration. For example, the teachings provided herein may be applied to other types of engines. Some such example alternative engines may include, without limitation, turbojets, turboshafts, and other turbofan configurations (e.g., wherein an intermediate spool includes an intermediate pressure compressor ("IPC") between a low-pressure compressor ("LPC") and a high-pressure compressor ("HPC"), and an intermediate pressure turbine ("IPT") between the high-pressure turbine ("HPT") and the low-pressure turbine ("LPT")).

Figure 2:
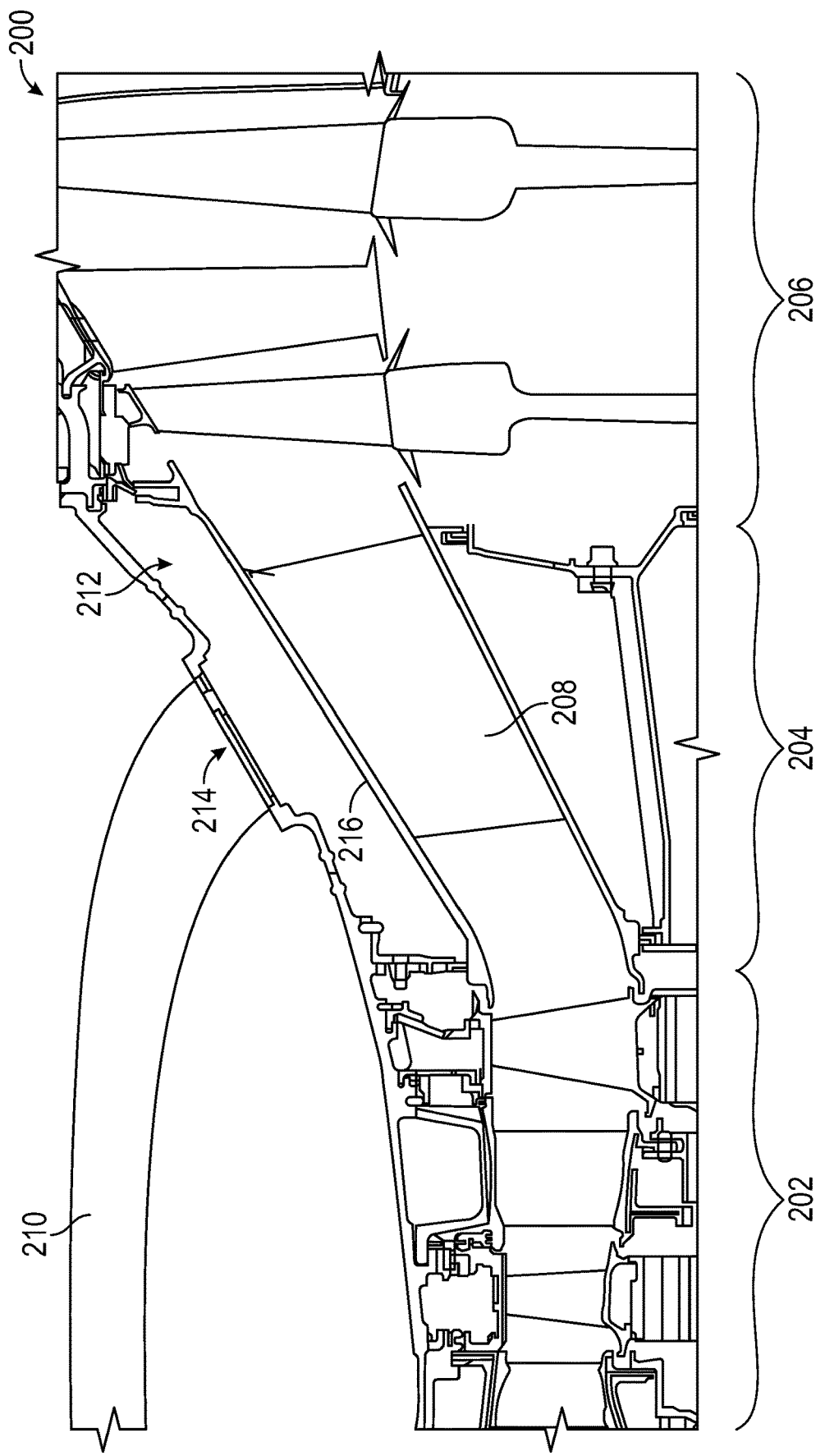
FIG. 2 is a schematic diagram of a portion of a gas turbine engine that may incorporate embodiments of the present disclosure.

Turning now to FIG. 2, a schematic illustration of a portion of a gas turbine engine 200 is shown. The gas turbine engine 200 includes a high pressure turbine system 202, a mid-turbine frame system 204, and a low pressure turbine system 206. The mid-turbine frame system 204 is arranged axially between the high pressure turbine system 202 and the low pressure turbine system 206 and includes a mid-turbine vane 208. Cooling is supplied to the mid-turbine frame system 204 through a cooling air conduit 210 and supplied into a cold flow impingement region 212 through a conduit outlet 214. The cooling air flowing through the cooling air conduit 210 will impinge upon a vane platform 216 and be dispersed about the mid-turbine frame system 204 and aftward toward the low pressure turbine system 206.

The impinging air will cause the impinged surface to be supplied with relatively cool air which then disperses about the remaining sections, portions, and areas of the vane platform 216. This may result in a relatively high thermal gradient in the material of the vane platform 216. Additionally, the cooling air, as it disperses about the vane platform 216 will have heat pickup. As such, the cooling air will be warmed prior to traveling aftward toward the low pressure turbine system 206, and thus cooling efficiency may not be as high if such heat pickup did not occur.

Embodiments of the present disclosure are directed to flow diverters for mid-turbine frame cooling air delivery. Various embodiments may reduce thermal gradients within the material of the mid-turbine frame system. Moreover, various embodiments may enable a cooler air to be delivered to a downstream low pressure turbine assembly.

Figure 3:
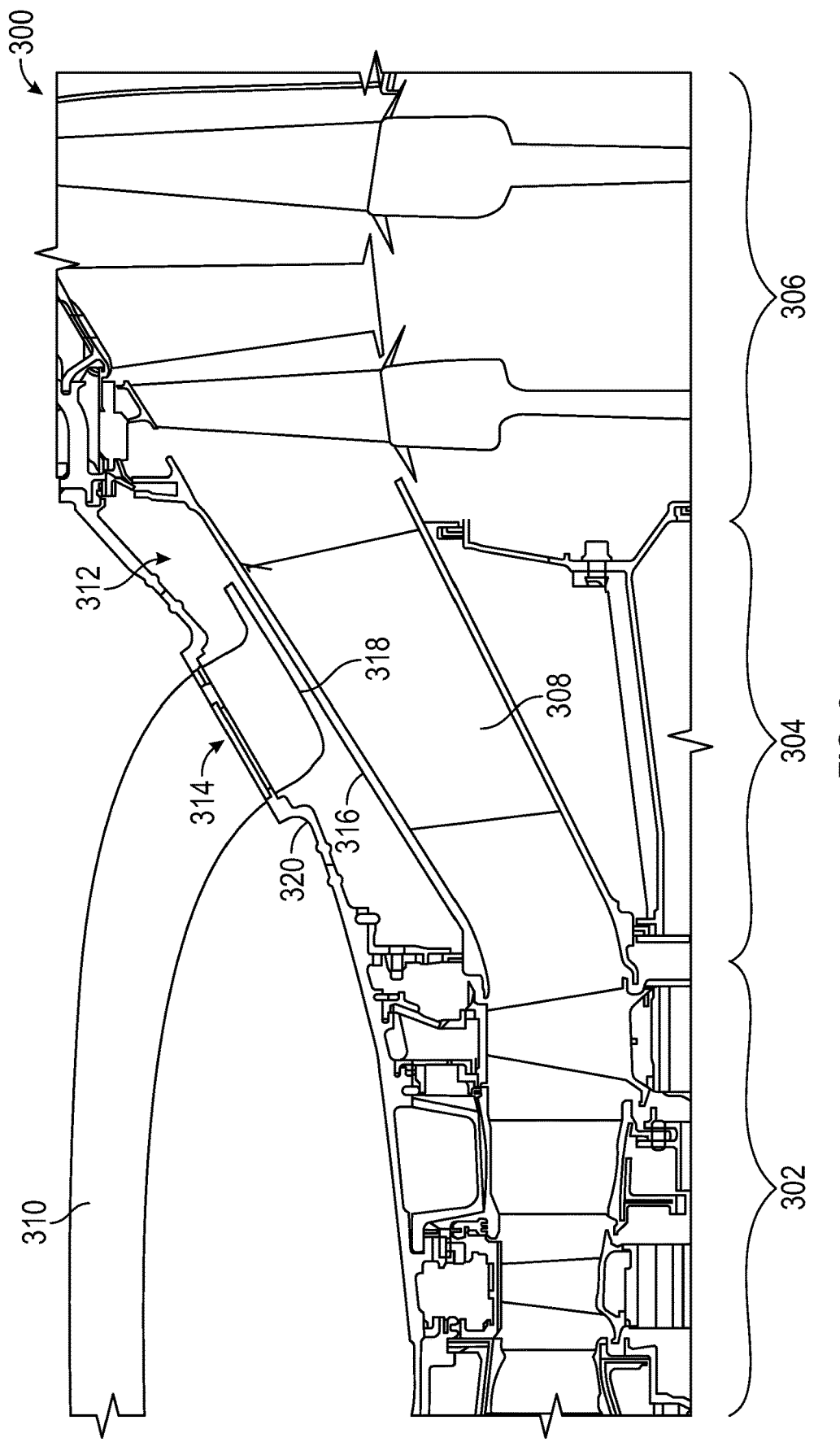
FIG. 3 is a schematic diagram of a portion of a gas turbine engine that illustrates incorporation of an embodiment of the present disclosure.

Turning now to FIG. 3, a schematic illustration of a portion of a gas turbine engine 300 is shown. The gas turbine engine 300 includes a high pressure turbine system 302, a mid-turbine frame system 304, and a low pressure turbine system 306. The mid-turbine frame system 304 is arranged axially between the high pressure turbine system 302 and the low pressure turbine system 306 and includes a mid-turbine vane 308. Cooling is supplied to the mid-turbine frame system 304 through a cooling air conduit 310 and supplied into a cold flow impingement region 312 through a conduit outlet 314. The cooling air flowing through the cooling air conduit 310 will impinge upon a vane platform 316 and be dispersed about the mid-turbine frame system 304 and aftward toward the low pressure turbine system 306.

As shown, in accordance with an embodiment of the present disclosure, a flow diverter 318 is arranged at the conduit outlet 314. The flow diverter 318 may be fixedly connected or removably connected to the conduit outlet 314, to a portion of the cooling air conduit 310, or to a frame 320 of the mid-turbine frame system 304. The flow diverter 318 is arranged and positioned within the cold flow impingement region 312 (e.g., between the vane platform 316 and the frame 320) to prevent direct impingement of a cooling flow upon the vane platform 316 and to direct a substantial (e.g., all or at least more than half) of the cooling flow in an aftward direction (e.g., toward the low pressure turbine system 306). Advantageously, such flow diverter can reduce or lessen a thermal gradient experienced by sections of the mid-turbine frame system 304 and also increase a cooling of sections of the gas turbine engine 300 that are downstream or aft of the mid-turbine frame system 304 (e.g., the low pressure turbine system 306).

Although FIG. 3 illustrates a single flow diverter 318 installed within a single conduit outlet 314, this is because such illustration is a cross-sectional view. It will be appreciated by those of skill in the art that one or more conduit outlets may be arranged circumferentially about a mid-turbine frame system to enable multiple locations of cooling flow to be directed to the mid-turbine frame system. For example, four or eight equally spaced conduit outlets may be arranged around a circumferentially shaped mid-turbine frame system, with each conduit outlet having a respective flow diverter installed thereto. The specific number of conduit outlets and respective flow diverters is not to be limiting, and any number of flow diverters may be installed within a gas turbine engine, depending on the system architecture, cooling requirements, and other considerations, as will be appreciated by those of skill in the art.

Figure 4A:
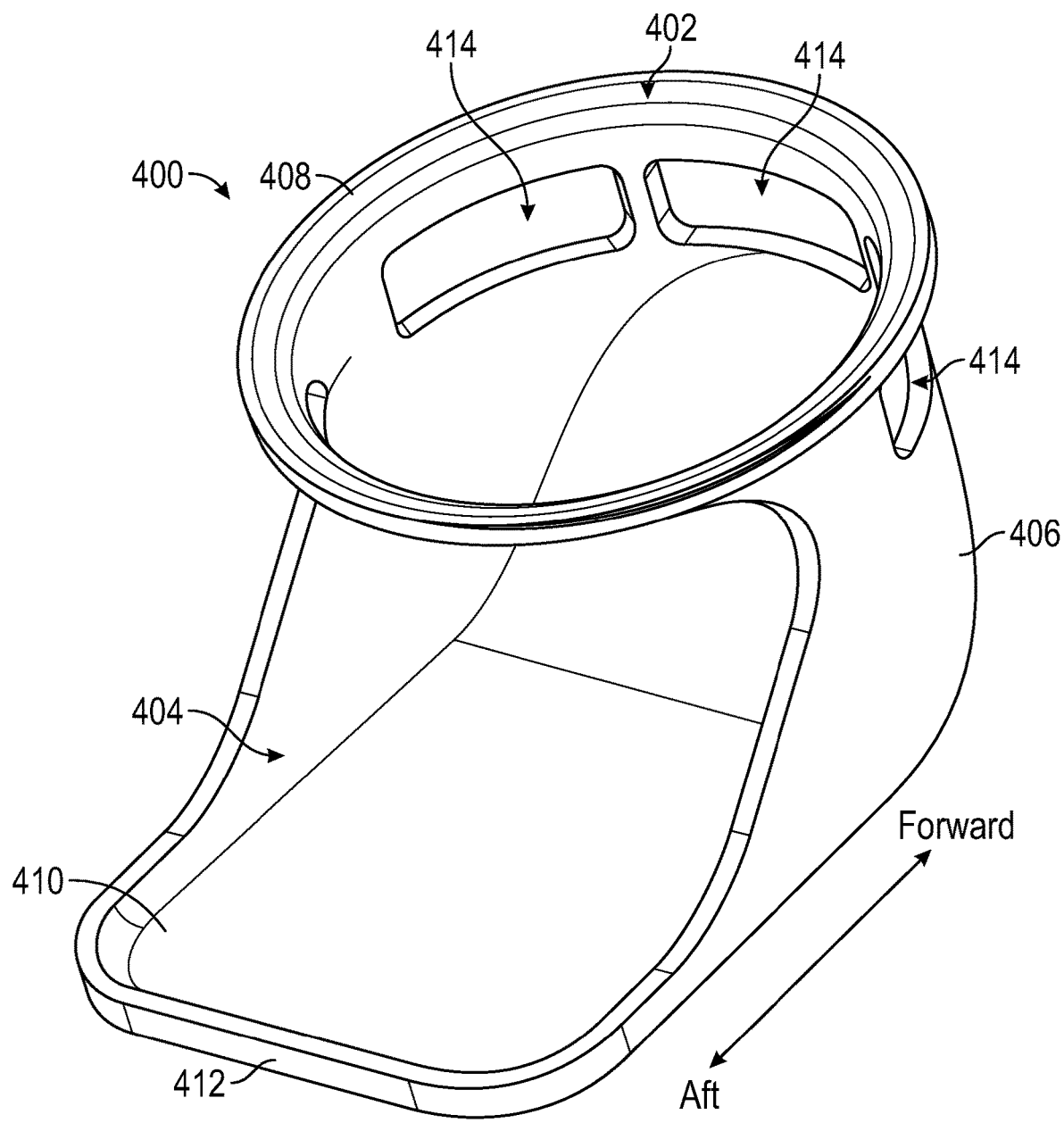
FIG. 4A is an isometric illustration of a flow diverter in accordance with an embodiment of the present disclosure.
Figure 4B:
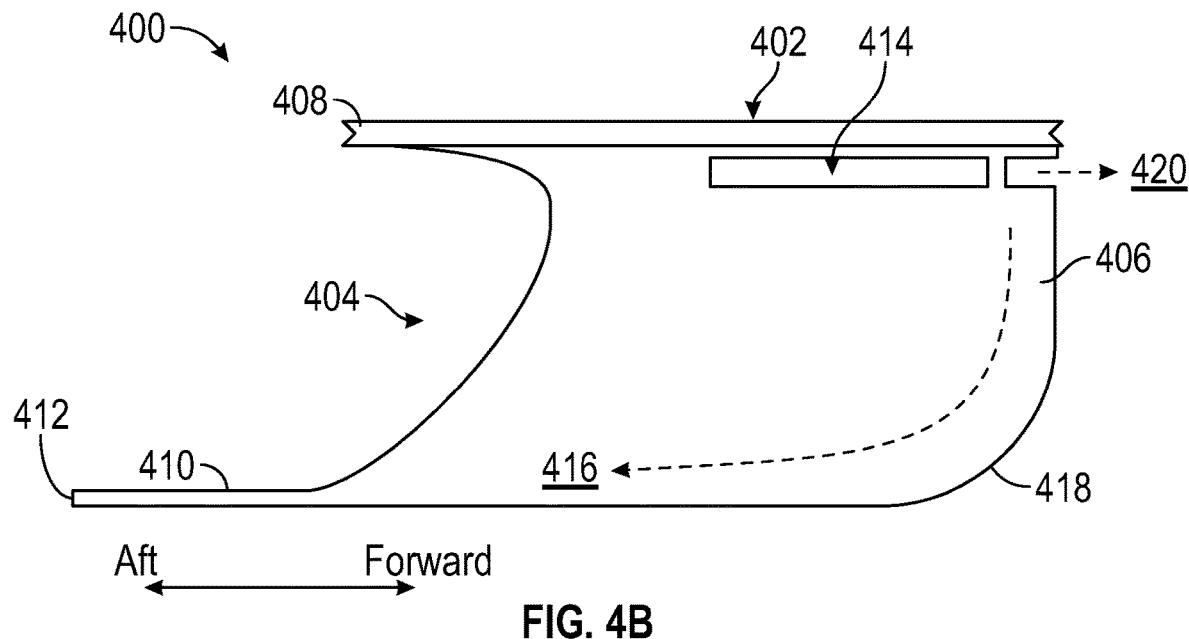
FIG. 4B is a side elevation illustration of the flow diverter of FIG. 4A.
Figure 4C:
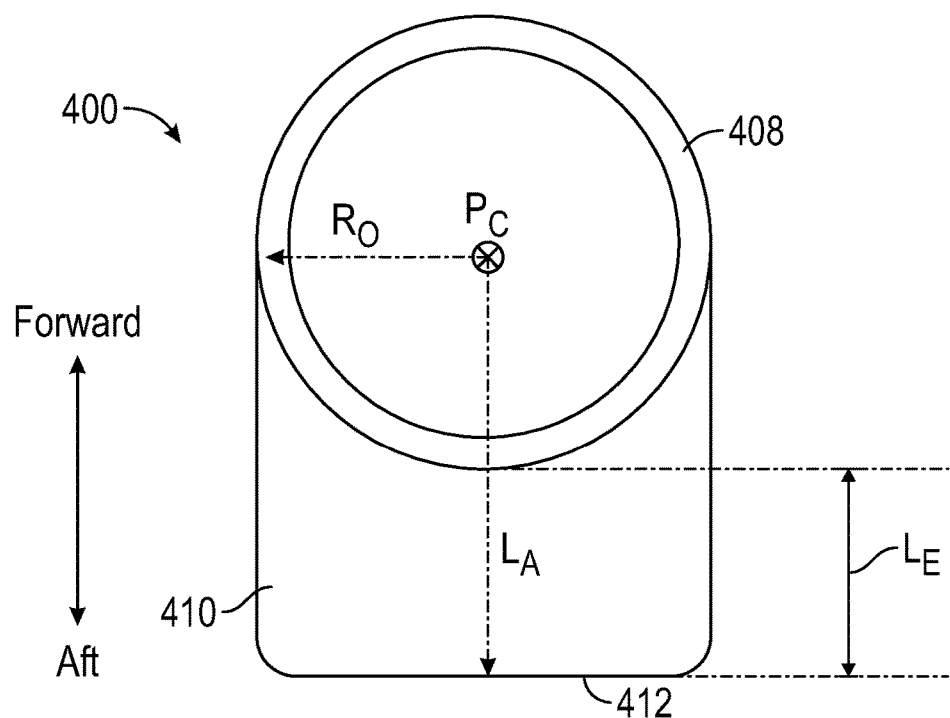
FIG. 4C is a top down plan view illustration of the flow diverter of FIG. 4A.

Turning now to FIGS. 4A-4C, schematic illustrations of a flow diverter 400 in accordance with an embodiment of the present disclosure are shown. The flow diverter 400 may be configured to be installed within a gas turbine engine. For example, the flow diverter 400 may be configured to be installed at a conduit outlet of a cooling air conduit that is configured to supply a cooling air to a mid-turbine frame system of the gas turbine engine.

The flow diverter 400 has a diverter inlet 402 and a diverter outlet 404, with a direction of flow at the diverter outlet 404 being arranged substantially normal or 90° from a direction of flow at the diverter inlet 402. As such, the flow diverter 400 is configured to change a direction of flow of incoming air, which, when installed may prevent direct impingement of the cooling flow upon a vane platform. The flow diverter 400 has a diverter body 406 that has a connector portion 408 that is configured to engage with or otherwise enable installation of the flow diverter 400 within a gas turbine engine. The diverter body 406 of the flow diverter 400 extends away from the connector portion 408 and curved toward the diverter outlet 404. The diverter body 406 includes a diverter extension 410 that extends to an outlet end 412. As such, the flow diverter 400 defines a flow path from the diverter inlet 402 through the diverter body 406 (and changed in direction) to the diverter outlet 404 and along the diverter extension 410 to the outlet end 412.

As shown in FIGS. 4A-4B, the flow diverter 400 further includes diversion slots 414. The diversion slots 414 are arranged to divert a portion of a flow through the flow diverter 400 in a direction other than that of the diverter outlet 404. For example, when installed within a gas turbine engine, the flow diverter 400 may be oriented such that the diverter outlet 404 faces aftward (e.g., the diverter extension 410 extends in a direction toward the aft of the engine). In such orientation, the optional diversion slots 414 may be arranged to divert a portion of the cooling flow in a forward direction (or other non-aft direction). The diversion slots 414 may be arranged proximate the diverter inlet 402 of the flow diverter 400 (i.e., closer to the diverter inlet 402 than the diverter outlet 404 along a flow path through the flow diverter 400).

FIG. 4B illustrates a side elevation view of the flow diverter 400 and FIG. 4C is a top down plan view of the flow diverter 400. As shown in FIG. 4B, the diverter body 406 defines a curved or sliding path 416 that extends from the connector portion 408 (and diverter inlet 402) toward the diverter outlet 404 and along the diverter extension 410. To achieve this, the diverter body 406 may include a curved portion 418, and when installed the curved portion 418 may be forward facing. The sliding path 416 may define the majority of the flow path of a cooling flow through the flow diverter 400. However, when the optional diversion slots 414 are included, as shown in FIGS. 4A-4B, a diversion flow 420 may flow out of the diversion slots 414 in, in this configuration, a forward direction. Further, depending on the number and orientation of diversion slots 414, a portion of the diversion flow 420 may be in a tangential direction (relative to an engine axis; e.g., into and/or out of the page of FIG. 4B).

The curved portion 418 may be referred to and operate as a blocking portion of the flow diverter 400. That is, the curved portion 418 is substantially solid and blocks or prevents flow therethrough, and thus enables the directing of a flow in a desired direction. In some embodiments, the blocking function of the curved portion 418 may block between about 80% and about 100%, inclusively. A 100% blocking configuration is a flow diverter having a solid curved portion with no diversion slots. However, in a less than 100% blocking configuration, one or more diversion slots may be configured to allow a portion of the flow through the flow diverter to be directed in a non-aft direction (e.g., forward or circumferentially/tangentially, relative to an engine axis). In some non-limiting embodiments, the diversion slots may be configured to allow between about 0% and about 50% of the flow through the flow diverter to be directed in non-aftward directions, or, in some non-limiting embodiments, between about 1% and about 20%.

FIG. 4C illustrates the nature of the diverter extension 410. The connector portion 408, in this embodiment, is circular, and configured to be installed into or at a conduit outlet of a cooling air conduit, as shown and described above. As such, the connector portion 408 and thus the diverter inlet 402 of the flow diverter 400 has a radius $R_O$ from a center point $P_C$. The diverter extension 410 is an extension of the diverter body 406 that extends an extension length $L_E$. The extension length $L_E$ is a length of material of the diverter extension 410 that extends beyond or more than the radius $R_O$ of the flow diverter 400. The extension length $L_E$ is a non-zero length and thus an total length $L_A$ of the flow diverter 400 from the center point $P_C$ to the outlet end 412 of the diverter extension 410 is greater than the radius $R_O$ of the flow diverter 400 (i.e., $L_A > R_O$; $L_A = R_O + L_E$). In some embodiments, the extension length $L_E$ may be between about 0% and about 500% of the radius $R_O$ of the flow diverter 400, or in some non-limiting embodiments, between about 5% and about 200%.

The shape, geometry, and features of the flow diverter shown and described with respect to FIGS. 4A-4C are not to be limiting, but rather are provided for illustrative and explanatory purposes. Various other geometries and/or features can be included or employed without departing from the scope of the present disclosure.

For example, FIG. 5 illustrates a flow diverter 500 in accordance with an embodiment of the present disclosure. The flow diverter 500 illustrated in FIG. 5 is substantially similar to that shown in FIGS. 4A-4C, but does not include the optional diversion slots.

FIG. 6 illustrates a flow diverter 600 in accordance with an embodiment of the present disclosure. The flow diverter 600 illustrated in FIG. 6 is substantially similar to that shown in FIGS. 4A-4C, but does not include the optional diversion slots. Further, in this configuration, the flow diverter 600 includes a separation rib 622 that divides an internal flow path of the flow diverter 600 into two or more separated flow paths. The separation rib 622 extends substantially the entire length from a diverter inlet to a diverter outlet of the flow diverter 600.

FIG. 7 illustrates a flow diverter 700 in accordance with an embodiment of the present disclosure. The flow diverter 700 illustrated in FIG. 7 is substantially similar to that shown in FIGS. 4A-4C, but does not include the optional diversion slots. Further, in this configuration, the flow diverter 700 includes a funnel structure 724 that is arranged about and defines a diverter outlet of the flow diverter 700.

Figure 8:
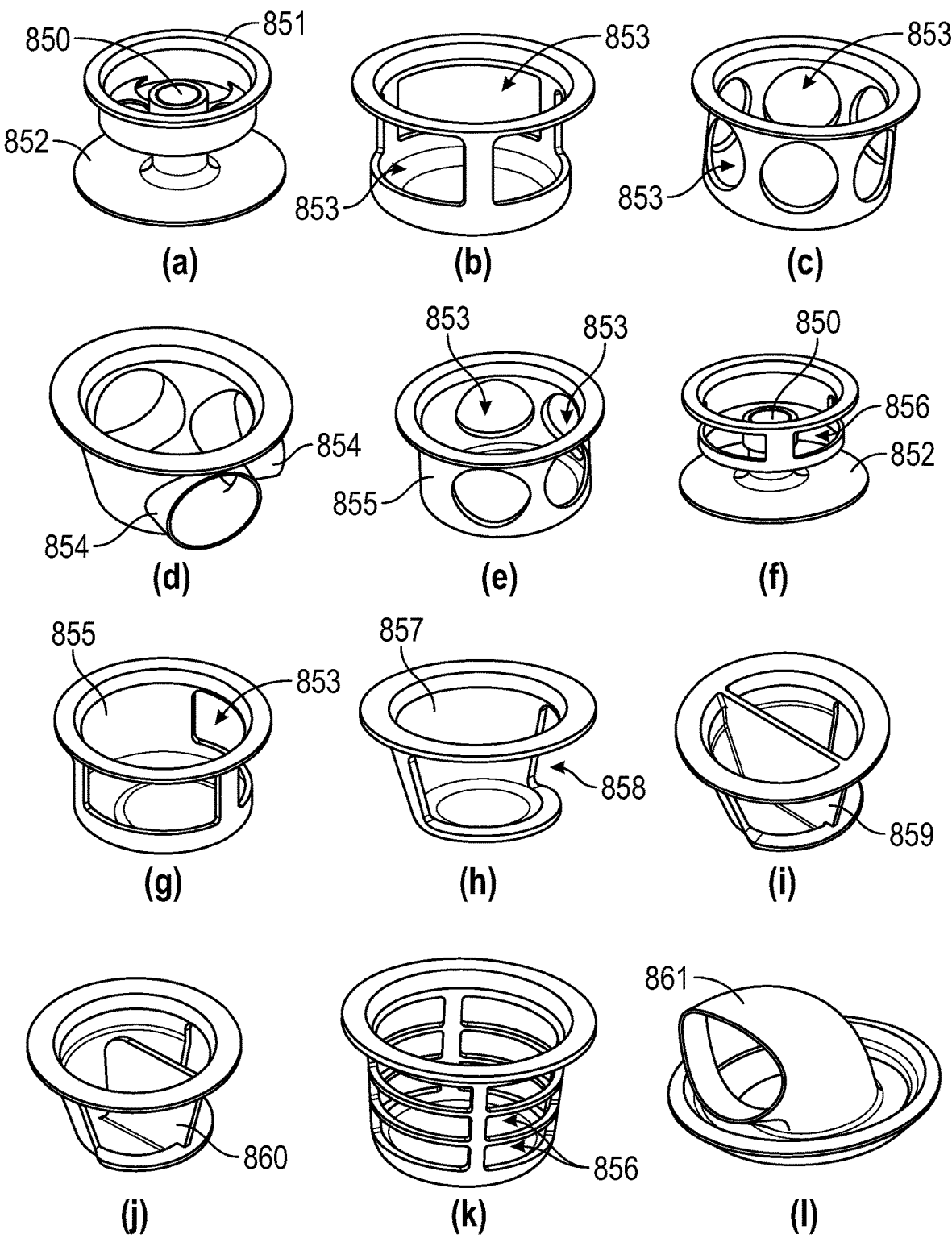
FIG. 8 is set of schematic illustrations of different configurations of flow diverters in accordance with embodiments of the present disclosure.

Turning now to FIG. 8, various different configurations (a)-(l) of flow diverters in accordance with the present disclosure are shown. Configuration (a) includes a central support 850 attached to a connector portion 851 and a unidirectional flow diverter 852 extending from the central support 850. Configurations (b) and (c) include pluralities of diverter outlets 853 to provide for multiple flow directions to be achieved. As shown, the diverter outlets 853 may have different geometric shapes and may vary in number.

Configuration (d) includes multiple tubular shaped diverter outlets 854. It is noted that the funnel structure 724 shown in FIG. 7 may be more tubular, as shown similar to that in configuration (d) of FIG. 8. Configuration (e) is similar to configuration (c), having multiple diverter outlets 853, but also includes a blocking portion 855 to prevent flow in a specific direction (e.g., forward). Configuration (0 is similar to that of configuration (a), having a central support 850 and a unidirectional flow diverter 852. However, configuration (f) also includes one or more diversion slots 856.

Configuration (g) is similar to configuration (b), having diverter outlets 853 but also a blocking portion 855, similar to configuration (e).

Configuration (h) is a split configuration, with a half-wall blocking portion 857 and a half-open diverter outlet 858. Configuration (i) is similar to configuration (h), but also includes a separation rib 859. Configuration (j) is similar to configuration (h), but also includes a partial separation rib 860, which enables the two separated portions to be fluidly connected along a half-wall blocking portion. Configuration (k) is arranged having a plurality of diversion slots 856, which extend along the full body of the flow diverter. Configuration (l) is a substantially tubular structure 861 from a diverter inlet to a diverter outlet.

It will be appreciated that additional features or structures may be incorporated into the flow diverters of the present disclosure. Moreover, the various features may be exchanged and incorporated into other combinations of features without departing from the scope of the present disclosure.

Figure 9:
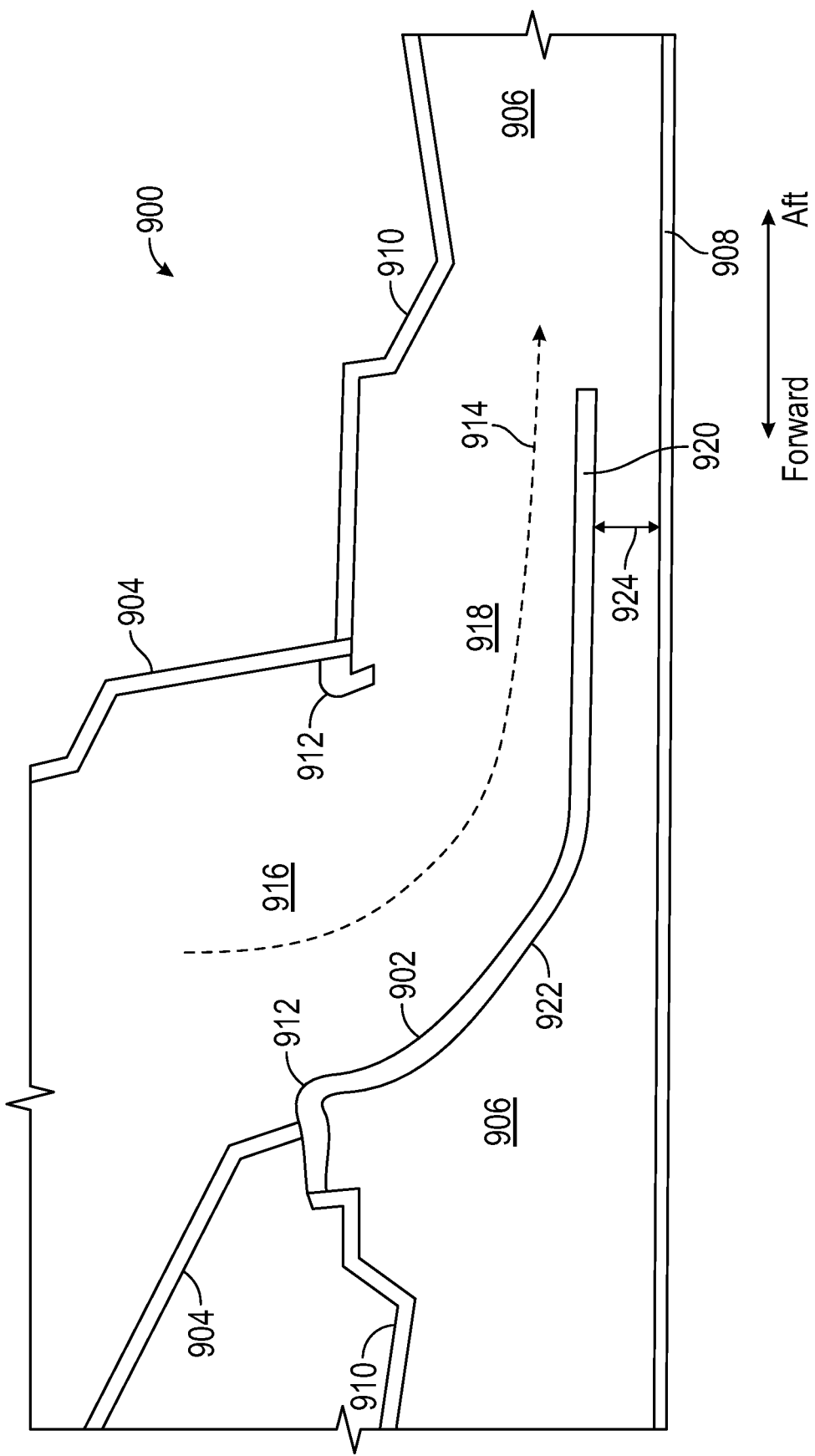
FIG. 9 is a schematic diagram of a portion of a gas turbine engine that illustrates incorporation of an embodiment of the present disclosure.

Turning now to FIG. 9, a schematic illustration of a mid-turbine frame system 900 having a flow diverter 902 in accordance with an embodiment of the present disclosure installed therein, is shown. The flow diverter 902 is installed at a conduit outlet of a cooling air conduit 904. The flow diverter 902 is configured to direct a cooling flow from the cooling air conduit 904 into a cold flow region 906 defined between a vane platform 908 and a frame 910 of the mid-turbine frame system 900.

The flow diverter 902 connects to the frame 910 and/or the cooling air conduit 904 by a connector portion 912. The connector portion 912 can provide for a press-fit, snap-fit, or interference-fit with the cooling air conduit 904 or a portion (e.g., aperture) of the frame 910. In other embodiments, the connector portion 912 can provide for a welding or bonding surface to fixedly connected or attach the flow diverter 902 within the mid-turbine frame system 900. Further, in some embodiments, the connector portion 912 can be a flange or other material or structure that enables the use of fasteners or other attachment mechanisms (e.g., bonding, welding, etc.) to attach the flow diverter 902 within the mid-turbine frame system 900.

The flow diverter 902 defines a flow path 914 that starts within the cooling air conduit 904, passes through a diverter inlet 916 of the flow diverter 902, passes through a diverter outlet 918 of the flow diverter 902, along a diverter extension 920, and into the cold flow region 906. The flow diverter 902 includes a curved portion 922 that provides for a relatively smooth fluid transition of the flow path 914 from the diverter inlet 916 to the diverter outlet 918. As shown, the flow diverter 902 is sized such that a separation gap 924 is present between the material of the flow diverter 902 and the vane platform 908. The separation gap 924 may be set to allow for thermal expansion and/or relative movement between the flow diverter 902 and the vane platform 908 and avoid contact between the two structures. When installed, the separation gap 924 may be between about 0 inches and about 5 inches.

Advantageously, embodiments described herein enable improved cooling within a gas turbine engine as compared to systems without such flow diverters. In accordance with some flow diverters described herein, a thermal gradient of the material of a mid-turbine frame system may lessened as compared to a direct impingement system. Furthermore, directed cooling air may be angled and directed toward a downstream low pressure turbine system, thus improving cooling of the downstream system. By directing the cooling flow through the flow diverters described herein, the cooling air reaching the low pressure turbine system may have less heat pickup, and thus higher cooling efficiency may be achieved.

As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A gas turbine engine comprising:
   a high pressure turbine system;
   a low pressure turbine system;
   a mid-turbine frame system arranged axially between the high pressure turbine system and the low pressure turbine system along an engine axis;
   a cooling air conduit fluidly connected to the mid-turbine frame system, the cooling air conduit configured to supply a cooling air to the mid-turbine frame system through a conduit outlet; and
   a flow diverter installed at the conduit outlet, the flow diverter having a diverter body comprising:
   a connector portion defining a diverter inlet;
   a diverter extension at least partially defining a diverter outlet;
   a curved portion arranged between the connector portion and the diverter extension, the curved portion configured to change a direction of flow that is a radial flow relative to the engine axis to an axial flow relative to the engine axis as the flow passes from the diverter inlet to the diverter outlet;
   at least one diversion slot formed in the diverter body and positioned proximate the connector portion at a location closer to the diverter inlet than the diverter outlet, wherein the at least one diversion slot is configured to direct a portion of the cooling air through the flow diverter to flow in a second direction different from the axial flow, wherein the second direction portion of the cooling air is equal to or less than 50% of a total flow through the flow diverter, wherein the flow diverter is installed within the conduit outlet such the air passing through the flow diverter is directed aftward toward the low pressure turbine system.

2. The gas turbine engine of claim 1, wherein the connector portion is configured to enable connection between the flow diverter the conduit outlet.

3. The gas turbine engine of claim 2, wherein the connector portion connects to the conduit outlet by one of press-fit, snap-fit, or interference-fit.

4. The gas turbine engine of claim 2, wherein the connector portion connects to the conduit outlet by one of welding, bonding, or one or more fasteners.

5. The gas turbine engine of claim 1, wherein the mid-turbine frame system comprises a frame, wherein the flow diverter is attached to the frame.

6. The gas turbine engine of claim 5, wherein the attachment of the flow diverter to the frame comprises one of fasteners, welding, and bonding.

7. The gas turbine engine of claim 1, wherein the mid-turbine frame system comprises a plurality of additional cooling air conduits and respective conduit outlets, the gas turbine engine further comprising:
a plurality of additional flow diverters, wherein each conduit outlet has a respective flow diverter installed thereto.

8. The gas turbine engine of claim 1, wherein the flow diverter includes a separation rib configured to separate a flow that flows through the flow diverter, wherein the separation rib extends between the diverter inlet and the diverter outlet.

9. The gas turbine engine of claim 1, wherein the flow diverter includes a funnel structure that defines the diverter outlet.

10. The gas turbine engine of claim 1, wherein the connector portion has a radius from a center point, and the diverter extension has a total length from the center point that is greater than the radius.

11. The gas turbine engine of claim 10, wherein a difference between the total length and the radius is defined as an extension length, wherein the extension length is up to 500% the length of the radius.

12. The gas turbine engine of claim 1, wherein the mid-turbine frame system comprises a vane platform, wherein the diverter extension is separated from the vane platform by a separation gap.

13. A flow diverter for installation in a mid-turbine frame system at a conduit outlet of a gas turbine engine, the flow diverter having a diverter body comprising:
a connector portion defining a diverter inlet;
a diverter extension at least partially defining a diverter outlet;
a curved portion arranged between the connector portion and the diverter extension, the curved portion configured to change a direction of flow from a first direction to a second direction that is 90° from the first direction as the flow passes from the diverter inlet to the diverter outlet; and
at least one diversion slot formed in the diverter body and positioned proximate the connector portion at a location closer to the diverter inlet than the diverter outlet, wherein the at least one diversion slot is configured to direct a portion of the flow through the flow diverter to flow in a non-second direction different from the second direction, wherein the non-second direction portion of the flow is equal to or less than 50% of a total flow through the flow diverter.

14. The flow diverter of claim 13, wherein the connector portion is configured to enable connection between the flow diverter the conduit outlet by one of press-fit, snap-fit, or interference-fit, welding, bonding, or one or more fasteners.

15. The flow diverter of claim 13, wherein the flow diverter includes a separation rib configured to separate a flow that flows through the flow diverter, wherein the separation rib extends between the diverter inlet and the diverter outlet.

16. The flow diverter of claim 13, wherein the flow diverter includes a funnel structure that defines the diverter outlet.

17. The flow diverter of claim 13, wherein the connector portion has a radius from a center point, and the diverter extension has a total length from the center point that is greater than the radius, wherein a difference between the total length and the radius is defined as an extension length, wherein the extension length is between 0% and 500% the length of the radius.

* * * * *